United States Patent
Drozt et al.

(10) Patent No.: US 11,051,133 B2
(45) Date of Patent: Jun. 29, 2021

(54) METHOD AND SYSTEM FOR DYNAMICALLY CHANGING THE INTERVAL TO RECEIVE DATA FROM AN EVOLVED MULTIMEDIA BROADCAST MUTICAST SERVICE BEARER

(71) Applicant: MOTOROLA SOLUTIONS, INC, Chicago, IL (US)

(72) Inventors: Peter M. Drozt, Prairie Grove, IL (US); Madhusudan Pai, Palatine, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 16/215,960

(22) Filed: Dec. 11, 2018

(65) Prior Publication Data

US 2020/0186972 A1 Jun. 11, 2020

(51) Int. Cl.
*H04W 4/06* (2009.01)
*H04W 24/08* (2009.01)
*H04W 72/00* (2009.01)

(52) U.S. Cl.
CPC ............. *H04W 4/06* (2013.01); *H04W 24/08* (2013.01); *H04W 72/005* (2013.01)

(58) Field of Classification Search
CPC ......... H04W 4/06; H04W 4/08; H04W 24/08; H04W 36/0005; H04W 36/0007; H04W 36/0094; H04W 68/00; H04W 72/005; H04W 76/40; H04W 52/0229; H04W 72/00; H04L 12/18; H04L 29/02; H04L 29/12; H04L 29/14; H04L 65/4076
See application file for complete search history.

(56) References Cited

U.S. PATENT DOCUMENTS

| | | | |
|---|---|---|---|
| 7,346,339 B2* | 3/2008 | Lee | H04L 12/1877 370/312 |
| 7,620,061 B2 | 11/2009 | Yi et al. | |
| 8,509,183 B2* | 8/2013 | Kim | H04W 36/0072 370/331 |
| 8,582,482 B2 | 11/2013 | Hsu | |
| 8,942,156 B2* | 1/2015 | Yang | H04W 72/005 370/312 |
| 9,107,186 B2* | 8/2015 | Zhang | H04L 5/0098 |
| 10,194,356 B2* | 1/2019 | Kim | H04W 36/0055 |
| 10,397,012 B2* | 8/2019 | Hu | H04L 12/185 |
| 10,405,251 B2* | 9/2019 | Lee | H04W 76/40 |
| 10,484,193 B2* | 11/2019 | Wang | H04W 76/36 |
| 10,820,230 B2* | 10/2020 | Pai | H04M 15/765 |
| 2005/0007971 A1* | 1/2005 | Jeong | H04L 12/189 370/312 |
| 2008/0261628 A1 | 10/2008 | Proctor et al. | |

(Continued)

FOREIGN PATENT DOCUMENTS

WO  WO-2015100724 A1 * 7/2015 ........ H04W 52/0229

*Primary Examiner* — Tri H Phan

(57) ABSTRACT

Techniques for dynamically changing the interval to receive data from an evolved multimedia broadcast multicast service bearer are provided. A wireless device may monitor a first bearer channel, the first bearer channel sending control messages at a first interval. An indication to monitor a second bearer channel may be received, the second bearer channel sending control messages at a second interval. The mobile device may monitor the second bearer channel at the second interval.

17 Claims, 5 Drawing Sheets

(56) References Cited

U.S. PATENT DOCUMENTS

| | | |
|---|---|---|
| 2018/0152978 A1 | 5/2018 | Jia |
| 2018/0338332 A1* | 11/2018 | Lee ........................ H04W 76/28 |
| 2019/0281481 A1* | 9/2019 | Shen ...................... H04W 24/08 |
| 2019/0350048 A1* | 11/2019 | Kim ....................... H04W 76/28 |

* cited by examiner

METHOD AND SYSTEM FOR DYNAMICALLY CHANGING THE INTERVAL TO RECEIVE DATA FROM AN EVOLVED MULTIMEDIA BROADCAST MUTICAST SERVICE BEARER

BACKGROUND

The 3rd Generation Partnership Project (3GPP) is a collection of organizational partners that establishes standards for mobile broadband technologies (e.g. LTE, HSDPA, W-CDMA, etc.) One aspect of these standards is Multimedia Broadcast Multicast Service (MBMS). When used in an LTE environment, MBMS may be referred to as evolved MBMS (eMBMS). As its name implies, eMBMS allows an LTE network to be used to wirelessly broadcast content to mobile devices, such as smartphones, tablets, laptops, or any other device capable of connecting to an LTE network. Such devices are typically referred to as User Equipment (UE).

An advantage provided by eMBMS is that it permits more efficient use of limited radio frequency (RF) spectrum. Rather than requiring each individual piece of UE to establish its own individual packet flow (and corresponding RF spectrum usage) to receive content, a single packet flow may be established. All UE that desire to receive the content that is being broadcast may receive the packet flow using only a single set of RF resources. Because only one packet flow is established, the same amount of radio resources are used regardless of if there is one or one hundred pieces of UE that wish to receive the broadcast content.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
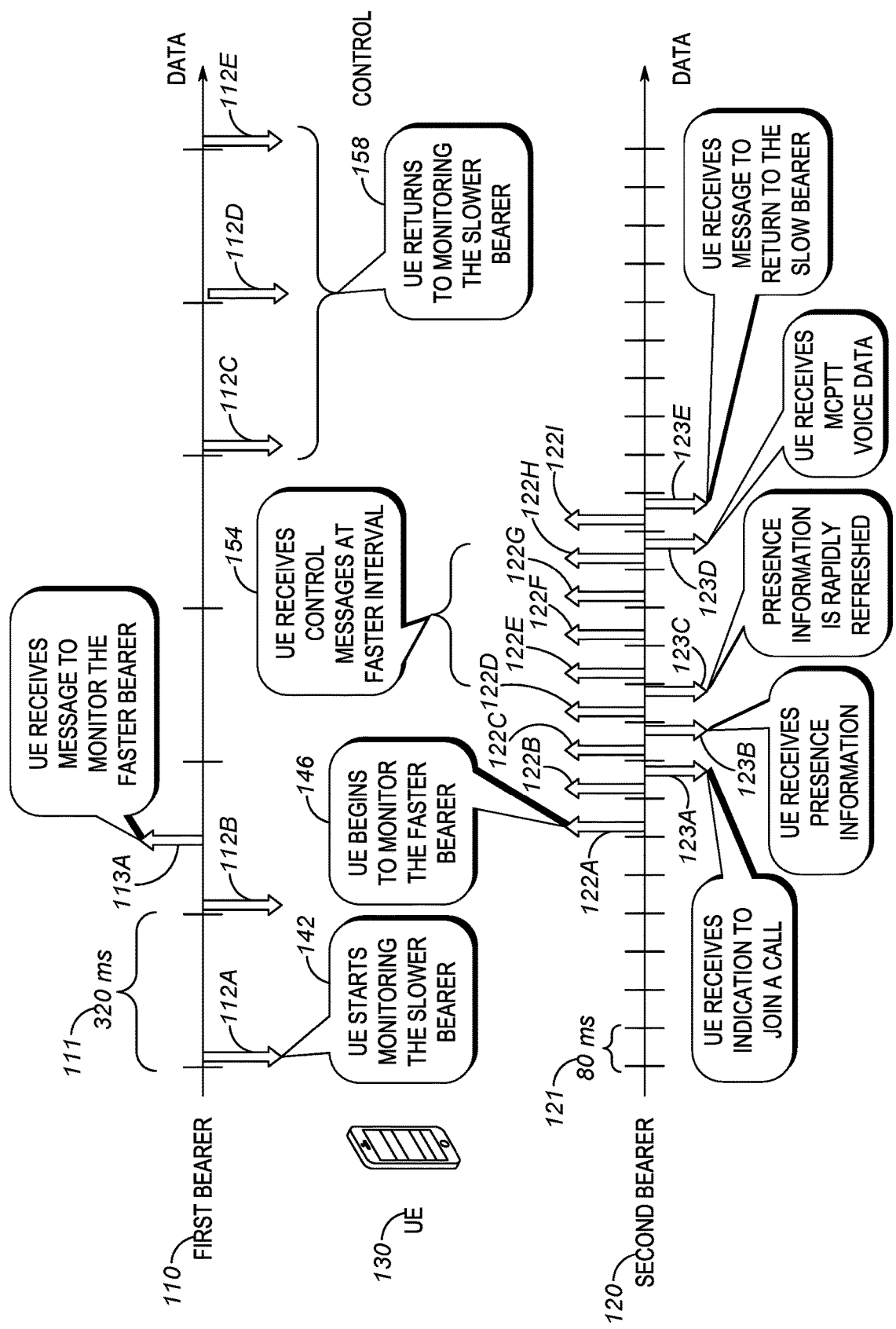
FIG. 1 is an example of transmitting eMBMS control messages at different intervals on different bearers.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The 3GPP has defined the use of eMBMS for various services, which include Mission Critical (MC) services. For example, one such service is MC Push to Talk (MCPTT). A bearer is defined to carry eMBMS related control messages. These control messages may be sent periodically, at a defined interval, on the bearer. In other words, a bearer may be associated with an interval and eMBMS control messages may be sent at the beginning of each interval. For purposes of this disclosure, control messages will refer to messages sent at the beginning of each defined interval which indicate if there is data available for the UE during that interval. For example, control messages may refer to the eMBMS control information related to the eMBMS multicast channel scheduling information (MSI).

The control messages may be used to notify UE if data will be sent during the interval. For example, the data may be MCPTT voice data. It should be understood that although the techniques described herein are usable with MCPTT communications, the techniques are not limited to any particular service. For ease of description, the term data will be used to describe any user plane data to be sent to the UE from an application service during the interval, regardless of the particular service the data is associated with. For example, data may refer to application control messages, which is any data an application desires to send to UE. Application control messages may include the content itself (e.g. presence information) or may include a command to monitor a different bearer for the actual data to be received by the UE (e.g. voice data for a MCPTT call). What should be understood is that control messages indicate if there is information to be communicated to the UE during the interval and data refers to the information the application server sends to the UE during the interval, which may include a command to receive data from a different bearer during the interval or subsequent intervals. If there is no data to be transmitted, the UE may stop monitoring the bearer until the interval time has passed and the next control message is sent. If there is data to be sent during the interval, the UE may be notified as to where that data can be retrieved. In some cases, the data may be sent on the bearer itself. In other cases, the UE may be instructed to retrieve the data from a different bearer. The techniques described herein are not limited by the particular bearer that transmits the data.

What should be understood is that the UE may monitor the bearer for a control message that is sent at the beginning of each interval. It should be noted that the control message can be sent as part of the bearer or may just be associated with it. For ease of description, the remainder of this disclosure will refer to control messages being sent on the bearer. This is for ease of description only and it should be understood that the UE receives control messages associated with the bearer, and the techniques described herein are applicable regardless of how the UE receives the control messages. If the control message indicates data is available (either on the bearer itself or on a different bearer) the UE may retrieve the data. If there is no data available, the UE may stop monitoring the bearer until the beginning of the next interval, wherein the next control message may be received.

A problem arises in the selection of an interval for the bearer. As mentioned above, if a control message indicates there is no data to be received, the UE may discontinue monitoring the bearer until the next interval. In many cases, in order to save battery power, when there is no data to be received, the UE may go into a low power mode (e.g. turn off radio transceiver) until the next interval. The 3GPP specification as of the time of the filing of this application allows for an interval as short as 40 ms. Thus, even in a case where there is no data to be received by the UE, the UE must come out of low power mode every 40 ms in order to receive the control message for that interval. The 3GPP specification also allows for longer intervals (e.g. 640 ms). In the case where there is no data to be received, the UE would be able to enter a low power mode for 640 ms before needing to wake up to receive the next control message.

The problem that arises is that selection of an interval that is too short results in greater battery usage, as the UE has a shorter amount of time that it is able to remain in the low power state before having to wake up to receive the next control message. However, selection of a longer interval results in slow responsiveness for the UE. For example, if data becomes available, it could require a wait as great as 640 ms before the UE wakes up to receive the control message instructing the UE to receive the data (either on that bearer or some other bearer).

The techniques described herein overcome these, and other, problems by providing at least two bearers for use in transmitting eMBMS control messages and data. The first bearer channel may be associated with a first interval. The second bearer channel may be associated with a second interval that is different than the first interval. For example, the second interval may be shorter than the first interval. Additional bearer channels may be associated with other, different intervals. In some cases, where it is expected that there will be no data to be sent to the UE, the devices may be instructed to monitor the first bearer channel, which operates at a longer interval. By doing so, the UE may be able to go into a low power state for longer periods of time, thus reducing the amount of battery power that is used. When certain conditions are met, such as data being currently available or it being anticipated that there will be data, including time sensitive data, to be sent to the UE, the UE can begin monitoring the second bearer channel which has a shorter interval. Although battery consumption may increase due to the shorter interval, the UE may become more responsive, as the length of time the UE remains in a low power state, where it cannot be instructed to receive data, is reduced.

An example method is provided. The method may comprise monitoring, with a wireless device, a first bearer channel, the first bearer channel sending control messages at a first interval, receiving an indication to monitor a second bearer channel, the second bearer channel sending control messages at a second interval, and monitoring, with the mobile device, the second bearer channel at the second interval. In one aspect, the first bearer channel and second bearer channel are evolved multimedia broadcast multicast services (eMBMS) bearer channels and the first interval is different than the second interval.

In one aspect, the method may further comprise continuing to monitor the first bearer channel while monitoring the second bearer channel. In one aspect, receiving the indication to monitor the second bearer channel may further comprise receiving the indication over the first bearer channel. In another aspect, receiving the indication to monitor the second bearer channel may further comprise receiving the indication as a unicast message directed to the wireless device. In another aspect, messages sent over the second bearer channel have greater time sensitivity than messages sent over the first bearer channel. In a further aspect, the method may further comprise, receiving an indication to discontinue monitoring the second bearer channel and discontinuing monitoring the second bearer channel. In a further aspect, the method may further comprise receiving the indication to monitor the second bearer channel in response to anticipated activity for the wireless device.

An example device is provided. The device may comprise a processor and a memory coupled to the processor. The memory may contain a set of instructions thereon that when executed by the processor cause the processor to monitor a first bearer channel the first bearer channel sending control messages at a first interval, receive an indication to monitor a second bearer channel, the second bearer channel sending control messages at a second interval, and monitor the second bearer channel at the second interval.

In one aspect, the first bearer channel and second bearer channel are evolved multimedia broadcast multicast services (eMBMS) bearer channels and the first interval is different than the second interval. In one aspect, the memory further comprises instructions to continue to monitor the first bearer channel while monitoring the second bearer channel. In one aspect, the instructions to receive the indication to monitor the second bearer channel further comprises instructions to receive the indication over the first bearer channel. In one aspect, the instructions to receive the indication to monitor the second bearer channel further comprises instructions to receive the indication as a unicast message directed to the wireless device. In one aspect, the messages sent over the second bearer channel have greater time sensitivity than messages sent over the first bearer channel.

An example non-transitory processor readable medium containing a set of instructions thereon is provided. The instructions, when executed by the processor cause the processor to transmit messages over a first bearer channel, the first bearer channel sending control messages at a first interval, transmit messages over a second bearer channel, the second bearer channel sending control messages at a second interval, determine a wireless device monitoring the first bearer channel shall monitor the second bearer channel, and send an indication to the wireless device to monitor the second bearer channel.

In one aspect, the medium further comprising instructions to send the indication to the wireless device to monitor the second bearer channel over the first bearer channel. In one aspect, the first interval is different than the second interval. In one aspect, the instructions to determine a wireless device monitoring the first bearer channel shall monitor the second bearer channel further comprise instructions to determine anticipated activity for the wireless device and determine that the anticipated activity for the wireless device includes time sensitive messages. In one aspect, the medium further comprises instructions to determine there is no additional anticipated activity including time sensitive messages and send an indication to the wireless device to discontinue monitoring the second bearer channel. In one aspect the first bearer channel and second bearer channels are evolved multimedia broadcast multicast services (eMBMS) bearer channels.

FIG. 1 is an example of transmitting eMBMS control messages at different intervals on different bearers. As shown, a first bearer 110 and a second bearer 120 may be provided. The 3GPP defines bearers that may be utilized to carry eMBMS control messages and other eMBMS data messages. The first and second bearer may be bearers configured to carry eMBMS control and data messages. The UE may become aware of multiple bearers via an enhancement to the 3GPP eMBMS bearer announcement procedure. The procedure may be enhanced such that multiple control channels may be specified. Each bearer may be associated with a defined signaling interval which is referred to in the 3GPP specifications as a Multicast Channel (MCH) Scheduling Period (MSP). As shown, the first bearer may be associated with a MSP 111 of 320 ms while the second bearer may be associated with a MSP 121 of 80 ms. It should be understood that the techniques described herein are not limited to any particular value of MSP and may be utilized with any currently existing or later defined acceptable values for the MSP.

At the beginning of each MSP, a control message may be sent, indicating to the UE 130 if there is data to be sent during the particular interval. The control messages are depicted by the arrows 112(A-E), 122(A-I) shown emerging from each of bearers 110,120 toward the center of the figure. It should be noted that although a control message is not shown as being sent for each bearer during each interval, this is only to indicate that the UE may not necessarily be monitoring for control message for that particular bearer. In operation, a control message would be sent for each interval for each bearer. The control messages may indicate if data is available for the UE during the corresponding interval. The actual data is depicted by arrows 113A, 123A-E, pointing towards the edge of the figure. As mentioned above, in some cases the data sent will be the actual data the application service wishes to send to the UE. In other cases the data will comprise a command from the application service to retrieve application data from a different bearer. It should be understood that the techniques described herein are not dependent on how the actual user plane data is sent to the UE. Furthermore, it should be understood that although only one UE 130 is depicted, there may be any number of additional UE. The depiction of a single UE is for purposes of ease of description only.

In operation, UE 130 may initially begin monitoring 142 the first bearer. As indicated, in the current example, the first bearer uses a MSP of 320 ms and will be referred to as the slower bearer. The UE may receive the first control message 112A. The control message may indicate that there is no data to be received by the UE. The UE may then enter a low power state to conserve battery until the 320 ms interval has completed and the next interval has begun.

Once the interval is complete, the next control message 112B may be received by UE 130. Control message 112B may indicate that data is available for the UE during the instant interval. Data 113A may be received by the UE during the interval. As shown, the UE may receive the data message 113A which instructs the UE to begin monitoring the faster bearer (e.g. the second bearer). As will be explained in more detail below, the UE may be directed to the faster bearer for a multitude of reasons, including that time sensitive data may be destined for the UE. The UE may then begin to monitor 146 the faster bearer 120, as shown by the UE receiving control message 122A. If control message 122A indicates there is no data available for the UE during the interval, the UE may enter the low power state to conserve battery. The UE will then wake up from the low power state at the next interval (e.g. 80 ms later) to receive the next control message.

Control message 122B may indicate that there is data available for the UE 130 during the interval. That data 123A may include an indication to join a call, such as an MCPTT call. The data 123A may itself include the indication to join the call or may direct to UE to a different bearer to receive an instruction to join the call (not shown). What should be understood is that control message 122B may be used to inform the UE that there is data available during the interval, and that data 123A includes whatever message the application service wishes to send to the UE.

Control message 122C may indicate that data is available for the UE during the next interval. For example, presence information 123B may be sent during the interval. In an MCPTT application, presence information may be provided for participants in a call in order to determine who is actually present on the call. Control message 122D may also indicate data is available during the next interval. Presence information 123C, for example, may then be sent during the interval. The application service may be rapidly updating presence information. What should be understood is that because the delay between receipt of control message 122C and 122D is based on the MSP of 80 ms, presence information can be updated more rapidly than if the UE was only receiving control messages every 320 ms on the first bearer. As should be clear, the delay is considerably shorter on the second bearer than the first bearer, given the much larger MSP of the first bearer.

Control messages 122(E-H) may be received at the beginning of each interval on the second bearer in order for the UE to receive control messages 154 at the faster interval provided by the second bearer 120. It should be noted that even though the control messages are received at a faster interval, this does not necessarily mean that data is available for the UE during every interval. For example, control messages 122(E-G) may indicate data is not available for each respective interval. As such, the UE may enter the low power state during those intervals. Control message 122H may indicate data is available in the next interval. For example, in an MCPTT service, the data 123D may be voice data related to a MCPTT voice call. In some implementations, the voice packets themselves may be included in data 123D. However, in other cases, data 123D may be a command to retrieve the voice packets from a different bearer (not shown).

What should be understood is that the UE 130 is notified of available data at the faster MSP. Once the application service determines there is no longer data to be sent at a faster rate (e.g. the MCPTT call has ended, the data transfer is complete, etc.) the UE may be instructed to stop monitoring the faster bearer and continue to monitor the slower, first bearer. For example, control message 122I may be received by the UE to indicate data is available in the next interval. Data message 123E may command the UE to stop monitoring the faster second bearer. The UE 130 may then continue 158 to monitor control messages 112(C-E) on the first bearer 110.

Figure 2:
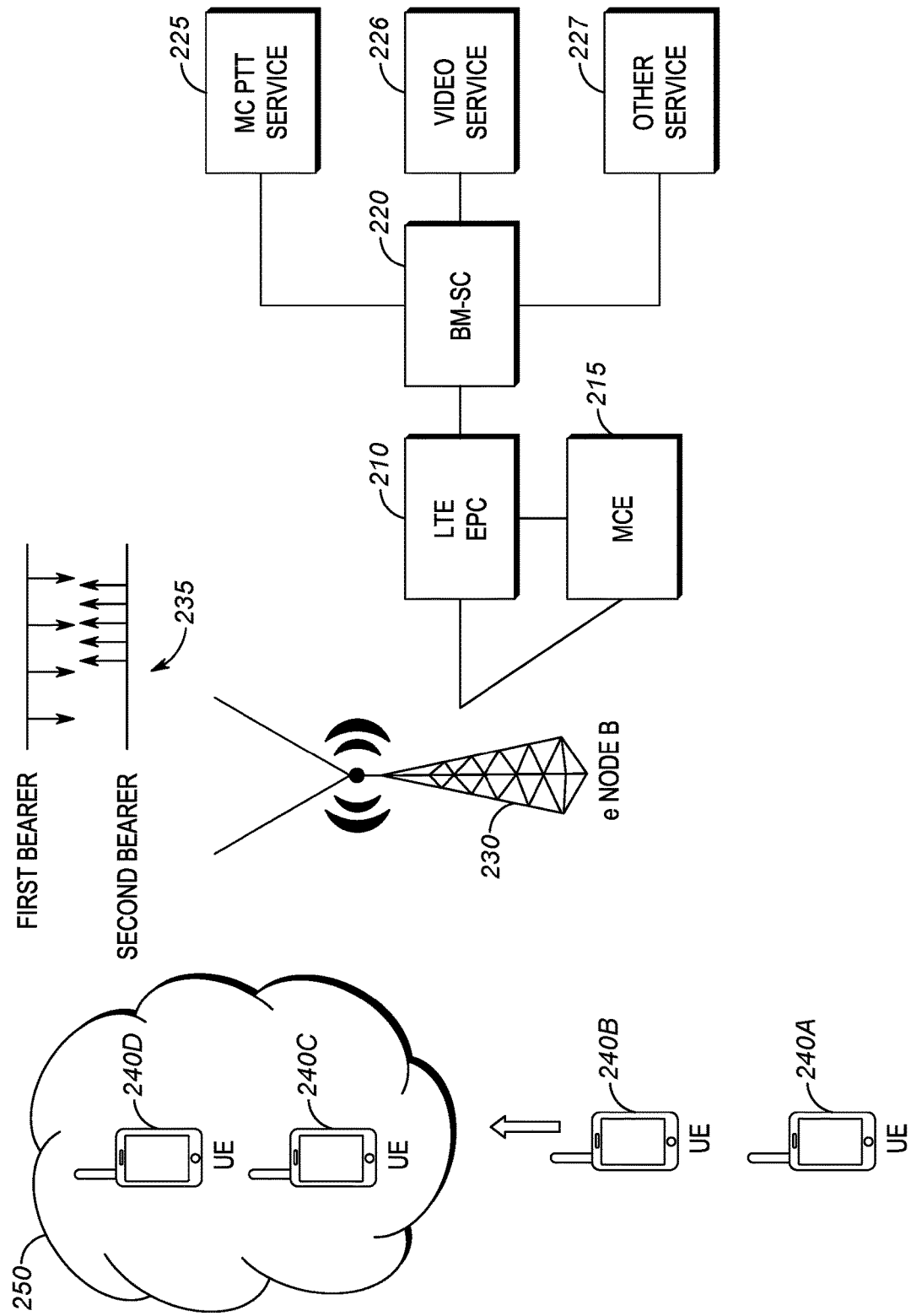
FIG. 2 is an example of a system which may utilize the dynamically changing interval techniques described herein.

FIG. 2 is an example of a system which may utilize the dynamically changing interval techniques described herein. System 200 may include a Long Term Evolution (LTE) Evolved Packet Core (EPC) 210 as defined by the 3GPP. The LTE EPC may include various elements (e.g. Home Subscriber Servers, Mobility Management Entities, Packet Data Network Gateways, Policy Charging and Rules Functions, etc.) that have been defined by the 3GPP in order to implement an LTE network. The techniques described herein may be utilized with any system that conforms to the 3GPP specifications.

In order to implement eMBMS, several entities are added that interface with the LTE EPC. For example, the Multicall/Multicast Coordination Entity (MCE) 215 may be utilized to handle tasks such as admission control and allocation of radio resources, starting and ending eMBMS sessions, and other eMBMS control signaling. In addition, a Broadcast Multicast Service Center (BM-SC) 220 may be included to act as an aggregator between various services (described below) that wish to use eMBMS functionality and the LTE EPC.

System 200 may also include various services. For example, one such service is a MCPTT service 225. MCPTT is a service that allows for devices, such as smartphones, to have push to talk capabilities similar to those found in portable walkie talkies. A subscriber may press a PTT button on his device and may instantaneously (or a very short delay) be connected to other users in a half duplex voice call. The other users can similarly engage their own PTT button, and when the half duplex channel is available (e.g. floor is granted) they may being speaking, with their audio transmitted to others in the talkgroup.

System 200 may also include other services. For example, video services 226 may be provided that allow users to engage in activities involving transmission of video. For example, just as MCPTT may allow for transmission of voice, video services may allow for transmission of video. The system 200 may also include other services 227. The techniques described herein are not dependent upon the particular service being provided. What should be understood is that regardless of the type of service being provided, one common characteristic is that the services may have a need to communicate with the UE at different rates.

For example, in the case of MCPTT, when a piece of UE is idle (e.g. not involved in an active call), there may be no need for the UE to be immediately responsive, and as such, the UE can monitor a bearer with a longer MSP, and accordingly conserve battery power. When the UE is about to enter or is currently in a call, having the UE be more responsive may be desirable to meet MCPTT performance characteristics. As such, the UE may be instructed (or determine by itself) that it should monitor a bearer with a faster MSP. Further use cases of bearers with different MSP are described below.

System 200 may include one or more eNodeB 230. Only a single eNodeB is shown for purposes of ease of description, however it should be understood that any number of eNodeBs may be present. The eNodeB may be used to create a radio access network (RAN). The RAN may be used by the wireless UE in order to connect the UE to the LTE EPC 210 in order to receive data (e.g. data from services 225-227). The RAN may transmit one or more bearers 235, such as those described with respect to FIG. 1. These bearers may be used to transmit eMBMS control messages and data, as described with respect to FIG. 1.

System 200 may include UE 240(A-D). UE 240 may be any type of device that is capable of connecting (directly or indirectly) to the RAN. For example, UE can include devices such as smartphones. In some cases, UE may include devices such as dispatch consoles. UE, in general, may be used to access services 225-227.

In order to clarify operation of system 200, several use cases are presented below. A first use case may be a piece of UE, such as UE 240A, that is currently idle. Because the UE 240A is currently idle, there is no need for the UE to monitor a bearer channel that is associated with a faster interval (e.g. second bearer 120). Instead, the UE may monitor a bearer channel with a slower interval (e.g. first bearer 110). As described above, by monitoring the slower bearer UE 240A may be able to conserve battery power.

At some point, it may be determined that UE 240A is about to be added to a MCPTT call. For example, MCPTT service 225 may become aware that UE 240A is to be included in a new MCPTT call. MCPTT server may then send an indication to UE 240A that it should begin monitoring a bearer with a faster interval (e.g. second bearer 120). As explained above, by monitoring the bearer with a faster interval, UE 240 allows the UE to become more responsive. When UE 240A is disconnected from the MCPTT session, the MCPTT server may inform the UE to return to monitoring the slower, first bearer 110.

In some example, use cases, the UE itself may determine a need to switch to the faster bearer. For example, UE 240C and UE 240D may be responding to a public safety incident in a defined geographic area 250. For example, UE 240C,D may be two police officers handling an incident and are currently in an active talkgroup. Because the talkgroup is active, UE 240C,D may be monitoring a faster bearer such as second bearer 120. UE 240B may currently be idle, and as such is monitoring slower bearer 110. As indicated by the arrow, UE 240B may be moving toward the defined geographic area 250. Once the UE enters the defined geographic area, it may be automatically added to the talkgroup that includes UE 240C,D. Thus, UE 240B, upon entering the defined geographic area 250 may determine, without an external instruction, that it should being monitoring the faster bearer 120 in order to be included in the talkgroup that includes UE 240C,D. There are many other examples wherein the UE itself may determine it should monitor the faster bearer. For example, local policies or server provided configuration data (e.g. time of day/duty shift) may cause the UE to monitor the faster bearer when configuration data criteria are met. As another example, when the operator of the UE performs certain actions (e.g. scan list change) the UE may determine it should monitor the faster bearer. What should be understood is that the indication to monitor the faster bearer may be generated by the UE itself, and does not necessarily originate from the network.

Another example use case may involve the distribution of presence/location information. For example, the first bearer 110 may be used to generate updates to presence/location information at a slower rate, using the longer interval to provide coarse grain location information to all users (e.g. location information is sent each interval). For some users, it may be desirable to have location information at a much finer level of granularity. For example, consider two police officers currently chasing a suspect. It might be beneficial for those two officers to be given near real time updates as to each other's location information. Thus, presence/location information could also be sent on a bearer with a faster interval (e.g. the second bearer 120) in order to provide a shorter interval between updates. When the fine grained presence/location information is no longer needed, the UE can return to monitoring the first, slower interval bearer.

Another example use case may be in the transmission of video images. It is known in the field of video transmission to break a video stream into important frames (e.g. i-frames) and less important frames (e.g. p-frames). Reception of only i-Frames may allow for a generation of a low quality version of the video image. The addition of p-Frames may cause the quality of the video image to improve. Thus, in one example use case, i-Frames may be sent using control messages sent over a slower interval bearer, such as first bearer 110. The second, faster bearer may be used to send p-Frames. User who wish to conserve battery power (at the expense of seeing lower quality video) may monitor the first bearer to receive i-Frames. Users who desire to see the highest quality video may monitor both bearers, in order to receive both the i-Frames and the p-Frames.

Returning to MCPTT, another possible use case relates to floor control messages. Typically, a user wishing to transmit audio presses his PTT button, and waits a moment for an acknowledgement tone that indicates he has been granted the floor and can begin speaking. Such messaging is not time sensitive. For example, waiting 640 ms before receiving an acknowledgement tone is not unreasonable. Thus, floor control messages may be sent over the first bearer. On the other hand, the actual voice data packets are much more sensitive to time delays. As such, voice data may be sent over a bearer that uses a much shorter interval. In other words, time sensitive data may be sent over a bearer associated with a faster interval, while less time sensitive data may be sent over a bearer with a slower interval.

As yet one more example use case, in an MCPTT call, there can be different audio reception requirements for different users. For example, there may be certain portions of audio that need to be heard by all participants in a talkgroup. There may be other portions of audio that may only be needed by certain participants (e.g. dispatch consoles). In this use case, portions of the audio that must be heard by all may be sent over the first bearer which operates at the longer interval. Portions that only need to be sent to a smaller set of users can be sent over the second bearer at the faster interval. Those users who need all the audio may monitor both bearers, while those that only need the portions intended for everyone may monitor the first bearer. As yet one more MCPTT related example, a UE may be registering or associating itself with a group while a call for that group is already in progress. The UE thus already has data available and may be instructed by the application server to begin monitoring the faster bearer.

It should be noted that the application services, such as those provided by service 225-227 may themselves keep track of which bearers a UE is monitoring and ensure that messages are not sent at an inappropriate rate. For example, if it is known that a UE is monitoring a bearer with a 640 ms interval, the application server should not send messages at an 80 ms rate. It should also be noted that the application servers themselves may be responsible for establishing the bearers with different MSP.

Figure 3:
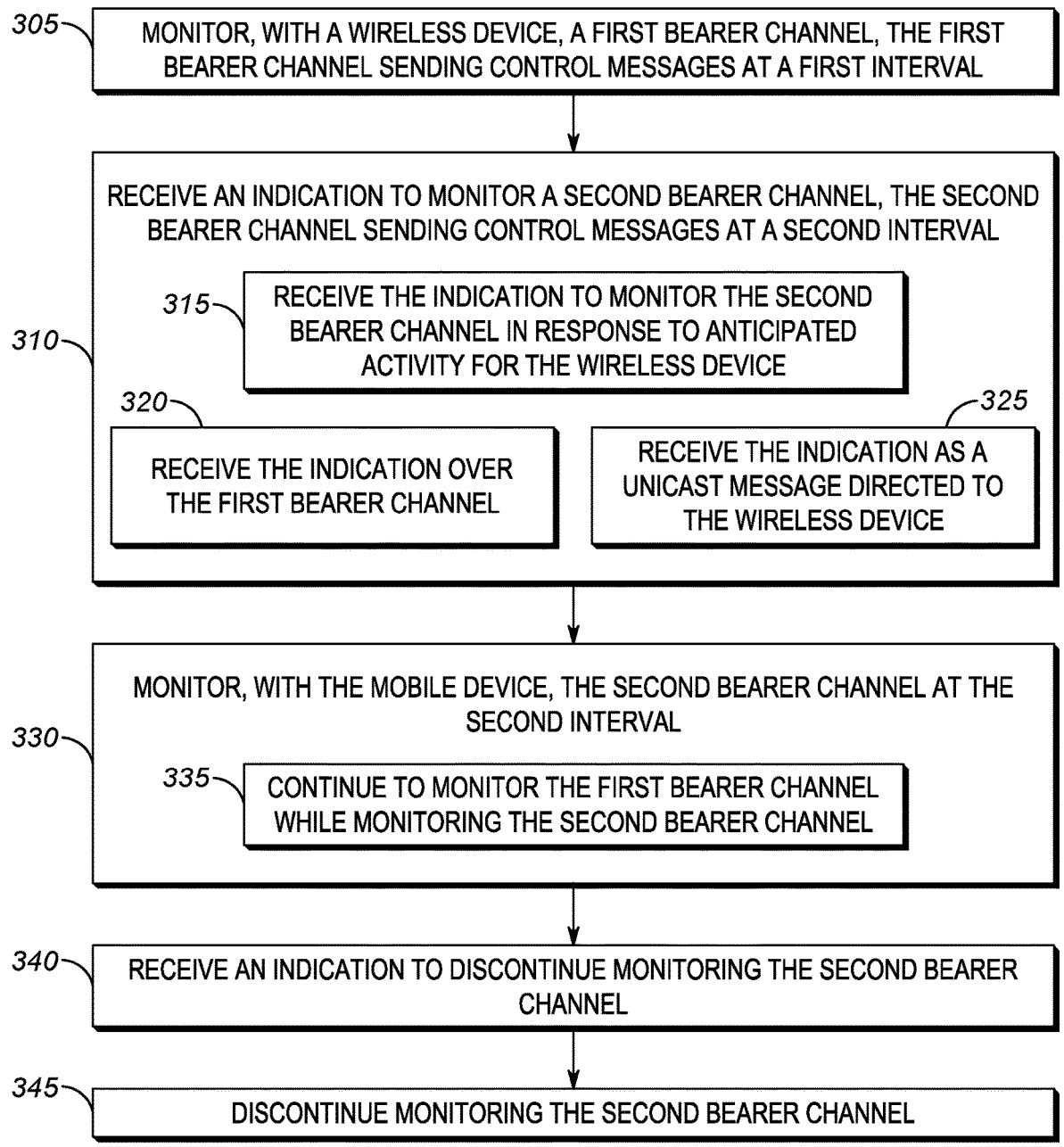
FIG. 3 is an example flow diagram for UE dynamically changing intervals for receiving eMBMS data.

FIG. 3 is an example flow diagram for UE dynamically changing intervals for receiving eMBMS data. In block 305 a wireless device may monitor a first bearer channel. The first bearer channel may send control messages at a first interval. As described with respect to FIG. 1, the interval, or MSP, may determine how often eMBMS control messages are sent.

In block 310 an indication to monitor a second bearer channel may be received by the wireless device. The second bearer channel may send control messages at a second interval. In some implementations, the first and second interval are different. For example, the first interval may be greater than the second interval. As another example, the first interval may be equal to or smaller than the second interval.

The indication to monitor the second bearer channel may be received for any number of reasons. For example, in block 315, the indication to monitor the second bearer channel may be received in response to anticipated activity for the wireless device. As explained above in the context of an MCPTT service, when it is known that a wireless device is going to be part of a call, the MCPTT system may determine that the wireless device should begin monitoring a bearer with a faster MSP in order to improve the responsiveness of the wireless device. As explained above, there are other reasons that the wireless device should begin monitoring a bearer with a faster MSP, such as the wireless device is entering a geographic area with an ongoing incident, and it is expected that there will be time sensitive date to be sent to the wireless device. The particular reason why the mobile device should begin monitoring the second bearer is relatively unimportant. The techniques described herein are applicable regardless of the reason the wireless device begins monitoring the second bearer channel.

In addition, the indication to monitor the second bearer channel may be received in any number of ways. For example, in block 320, the indication to monitor the second bearer channel may be received over the first bearer channel. As explained with respect to control message 112B, the instruction to monitor the second bearer channel may be an explicit instruction sent from an external source to the wireless device via the eMBMS control message sent over a bearer carrying eMBMS control messages. In other cases, as shown in block 325, the indication may be received as a unicast message directed to the wireless device specifically. As mentioned above, eMBMS control messages may be monitored by multiple UE. However, the UE are still able to receive messages sent directly, in a point to point manner. Such a message may be used to direct the wireless device to begin monitoring the second bearer channel.

Furthermore, the indication to begin monitoring the second bearer may not come from an external source at all, but rather is generated internally by the wireless device. For example, when the wireless device enters a specific geographic area, it may begin monitoring the second bearer. In other cases, and internal parameter (e.g. time of day) may indicate to the wireless device that it should begin monitoring the second bearer. What should be understood is that the indication to begin monitoring the second bearer may come from sources external to the wireless device or from the wireless device itself.

In block 330, the mobile device may begin monitoring the second bearer channel at the second interval. As explained above, if the MSP of the second bearer is greater than the first bearer, the wireless device may spend more time in a low power state, whereas if the second interval is less than the first interval, the wireless device may become more responsive as it will receive control messages at a faster rate. In block 335, the wireless device may continue to monitor the first bearer channel while monitoring the second bearer channel. As explained above, in some cases, the mobile device may still need to receive data associated with the first bearer (e.g. general call/presence information) while also participating in a specific call (e.g. within a geographic incident area).

In block 340, the wireless device may receive an indication to discontinue monitoring the second bearer channel. As above, the indication may come from a source external to the wireless device or may be generated by the wireless device itself. For example, the condition that caused the wireless device to begin monitoring the second bearer channel may no longer exist, and as such the wireless device no longer needs to monitor the second bearer. As above, the indication may come over the second bearer itself, or may be received via a unicast message directed only to the UE. The indication may also be generated internally by the wireless device (e.g. leaving the geographic area of an active incident, time of day, etc.). In block 345 the wireless device may discontinue monitoring the second bearer.

Figure 4:
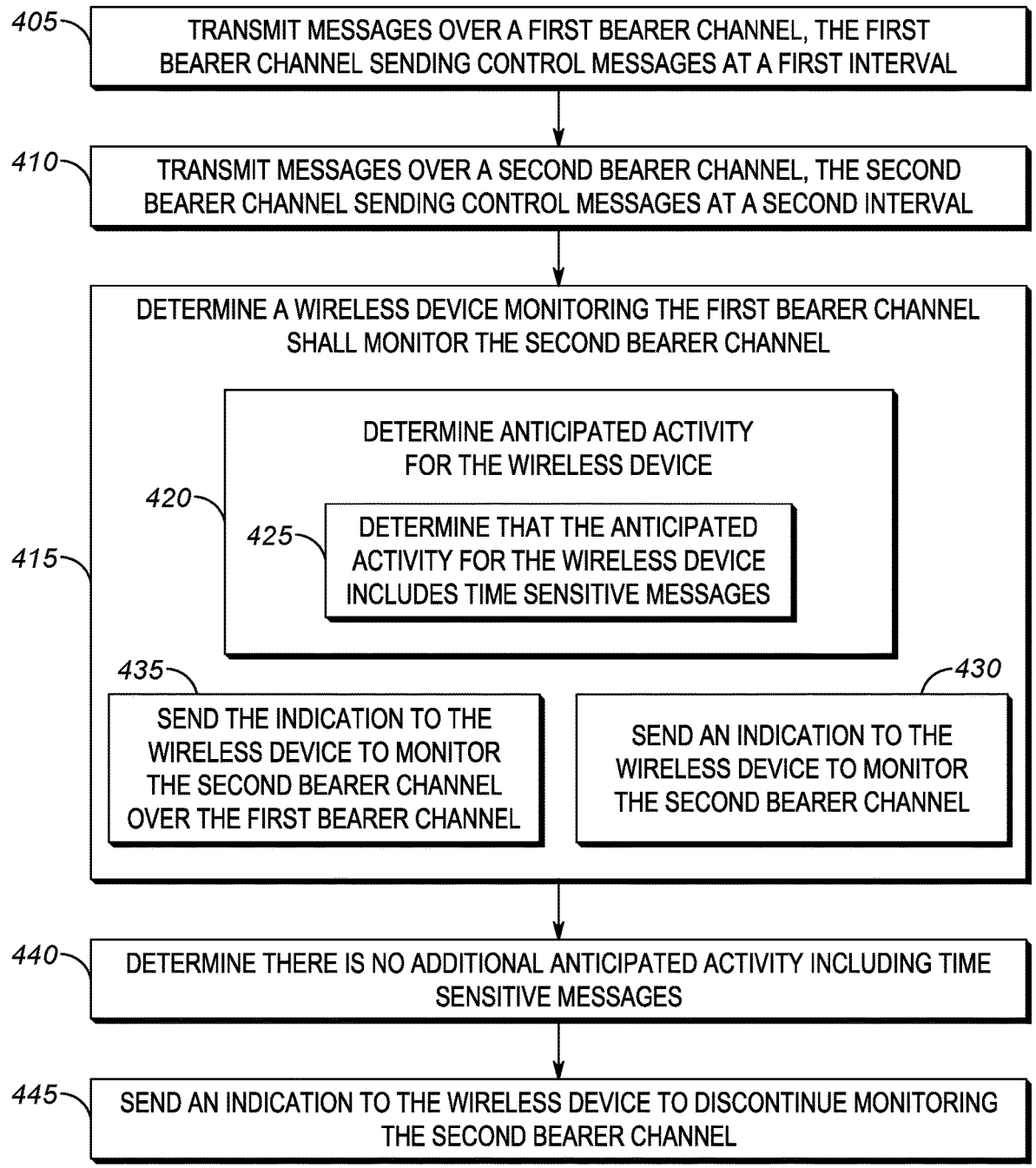
FIG. 4 is an example flow diagram of the network dynamically changing intervals for sending eMBMS data.

FIG. 4 is an example flow diagram of the network dynamically changing intervals for sending eMBMS data. As mentioned above, there are many reasons why an application service may wish to cause a UE to begin monitoring a faster bearer. In addition, an application service may follow certain rules regarding which bearer to send data on.

For example, the application service may only send one data message per interval, as the UE would not be able to receive more than one data message per interval. As another example, if there is duplicative data to be sent during an interval, only one copy of the data may be sent, and the rest discarded. If newer data is made available while waiting for the UE for the next interval, the newer data may replace the older data, which may then be discarded. In some cases, if multiple unique data is available, that data may be combined into a single piece of data, such that it may all be sent during one interval, rather than waiting for multiple intervals to send each piece of data individually.

In block 405, messages may be transmitted over a first bearer channel, the first bearer channel sending control messages at a first interval. In block 410, messages may be transmitted over a second bearer channel, the second bearer channel sending control messages at a second interval. In general, the first and second bearer channels may correspond to the first bearer 110 and the second bearer 120 described with respect to FIG. 1.

In block 415, it may be determined that a wireless device monitoring the first bearer channel shall monitor the second bearer channel. As described above, monitoring a second bearer channel at a different rate may be done for any number of reasons. One reason may be that it has been determined that there is currently activity for the wireless device. For example, a call may already be in progress for the wireless device, and the wireless device may currently be registering with the network. As another example, as shown in block 420, activity for the wireless device may be anticipated. For example, the wireless device may be in the process of being included in an MCPTT call. Thus, it may be anticipated that the wireless device may need to become more responsive to control messages, which may be achieved by causing the wireless devices to switch to a bearer channel with a shorter MSP interval. In block 425 it may be determined that the anticipated activity for the wireless device includes time sensitive messages. For example, in the case of voice data for an MCPTT call session, the transmission of the voice data is time sensitive as excessive delays may cause the received audio to become unintelligible. However, other types of data (e.g. text based information) may not be affected excessively by delays. As such, in some implementations, the time sensitivity of data may be a factor in determining if the wireless device should begin monitoring a different bearer.

In block 430, an indication may be sent to the wireless device to monitor the second bearer channel. In block 435, the indication to monitor the second bearer channel may be sent over the first bearer channel. In some implementations, the indication to monitor the second bearer channel may be sent over a unicast channel directly to the wireless device instead of using the eMBMS signaling over the first bearer. In other implementations, the wireless device itself may determine that it should begin monitoring the second bearer (e.g. after entering a geographic region with an ongoing incident).

In block 440, it may be determined that there is no additional anticipated activity including time sensitive messages that need to be sent to the wireless device. For example, whatever the event/condition that caused the wireless device to begin monitoring the second bearer may no longer exist. As such, the wireless device may no longer need to monitor the second bearer. In block 445 an indication may be sent to the wireless device to discontinue monitoring the second bearer channel.

Figure 5:
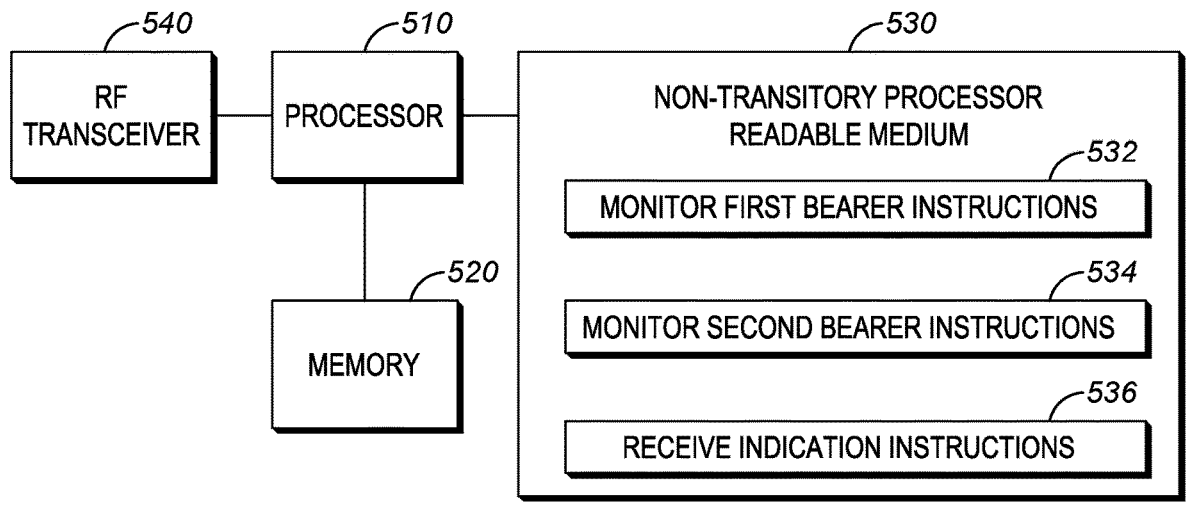
FIG. 5 is an example of UE that may utilize the dynamically changing intervals techniques described herein.

FIG. 5 is an example of UE device that may utilize the dynamically changing intervals techniques described herein. Device 500 may be any type of device that is able to at least monitor control messages, such as eMBMS control messages, on at least one bearer channel, wherein the bearer channel is associated with an MSP interval. Example devices may include smartphones, tablets, digital assistants, two way radios, walkie talkies, or any other type of device capable of receiving eMBMS messages.

Device 500 may include a processor 510. The processor may be coupled to a memory 520, a non-transitory processor readable medium 530, and a RF transceiver 540. The processor may execute instructions stored on the memory to implement the techniques described herein. For example, the processor may cause processor readable instructions from the non-transitory processor readable medium 530 to be stored in the memory and the processor may execute those instructions from the memory. In some implementations, the processor may execute the instructions directly from the non-transitory processor readable medium.

The non-transitory processor readable medium 530 may contain a set of instructions thereon. Those instructions, when executed, may cause the device 500 to implement the dynamically changing the interval to receive data from an eMBMS bearer techniques described herein.

The medium 530 may include monitor first bearer instructions 532, which may allow the UE to monitor a first bearer that is associated with a first MSP interval. The medium may also include monitor second bearer instructions 534, which may allow the UE to monitor the second bearer that is associated with a second MSP interval. The medium may also include receive indication instructions 536, which may allow the UE to receive an indication that it should start or stop monitoring the second bearer. The operation of the instructions contained on medium 530 are described in more detail with respect to FIGS. 1 and 2 and the example flow chart depicted in FIG. 3.

Device 500 may also include RF transceiver 540. RF transceiver 540 may allow device 500 to create a wireless connection to the LTE network described with respect to FIG. 2. The RF transceiver may allow the device 500 to receive messages (both control and data) on various bearers, including the first and second bearer described with respect to FIG. 1.

Figure 6:
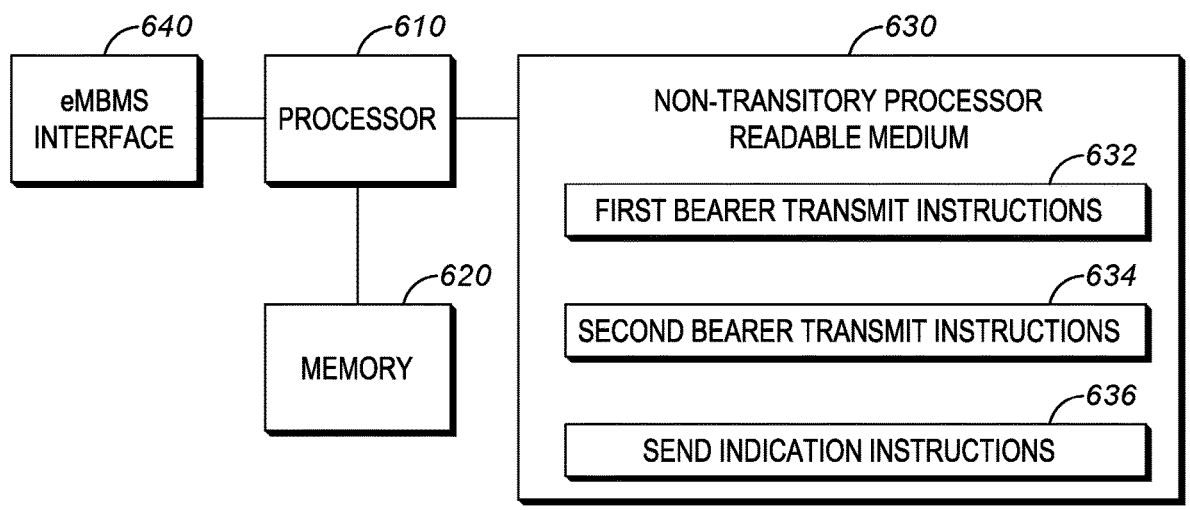
FIG. 6 is an example of network servers that may utilize the dynamically changing intervals techniques described herein.

FIG. 6 is an example of a network server that may utilize the dynamically changing intervals techniques described herein. Device 600 may be any type of device that is able to interface with an eMBMS system as described with respect to FIG. 2. For example, device 600 may be a server, such as the application servers that interface with the LTE network. Device 600 may be components of the LTE network itself. What should be understood is that device 600 may be utilized to determine on which bearer a control message to be sent to a UE is included. In some cases, the device 600 may instruct the UE to monitor a specific bearer.

Device 600 may include a processor 610. The processor may be coupled to a memory 620, a non-transitory processor readable medium 630, and a eMBMS interface 640. The processor may execute instructions stored on the memory to implement the techniques described herein. For example, the processor may cause processor readable instructions from the non-transitory processor readable medium 630 to be stored in the memory and the processor may execute those instructions from the memory. In some implementations, the processor may execute the instructions directly from the non-transitory processor readable medium.

The non-transitory processor readable medium 630 may contain a set of instructions thereon. Those instructions, when executed, may cause the device 600 to implement the dynamically changing the interval to receive data from an eMBMS bearer techniques described herein.

The medium 630 may include first bearer transmit instructions 632, which may allow the device 600 to send control messages on a first bearer with the first bearer sending control messages at a first MSP interval. The medium may also include second bearer transmit instructions 634, which may allow the device 600 to send control messages on a second bearer with the second bearer sending control messages at a second MSP interval. The medium may also include send indication instructions 636, which may allow the device 600 to provide an indication to the UE that it should start or stop monitoring the second bearer. The operation of the instructions contained on medium 630 are described in more detail with respect to FIGS. 1 and 2 and the example flow chart depicted in FIG. 4.

Device 600 may also include eMBMS interface 640. Interface 640 may allow device 600 to interact with the eMBMS LTE system described with respect to FIG. 2. The eMBMS interface may allow the device 600 to send messages (both control and data) on various bearers, including the first and second bearer described with respect to FIG. 1.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    monitoring, with a wireless device, a first bearer channel, the first bearer channel sending control messages at a first interval;
    receiving an indication to monitor a second bearer channel, the second bearer channel sending control messages at a second interval; and
    monitoring, with the wireless device, the second bearer channel at the second interval, wherein the first bearer channel and second bearer channel are evolved multimedia broadcast multicast services (eMBMS) bearer channels and the first interval is different than the second interval.

2. The method of claim 1 further comprising:
continuing to monitor the first bearer channel while monitoring the second bearer channel.

3. The method of claim 1 wherein receiving the indication to monitor the second bearer channel further comprises:
receiving the indication over the first bearer channel.

4. The method of claim 1 wherein receiving the indication to monitor the second bearer channel further comprises:
receiving the indication as a unicast message directed to the wireless device.

5. The method of claim 1 wherein messages sent over the second bearer channel have greater time sensitivity than messages sent over the first bearer channel.

6. The method of claim 1 further comprising:
receiving an indication to discontinue monitoring the second bearer channel; and
discontinuing monitoring the second bearer channel.

7. The method of claim 1 further comprising:
receiving the indication to monitor the second bearer channel in response to anticipated activity for the wireless device.

8. A device comprising:
a processor;
a memory coupled to the processor, the memory containing a set of instructions thereon that when executed by the processor cause the processor to:
monitor a first bearer channel the first bearer channel sending control messages at a first interval;
receive an indication to monitor a second bearer channel, the second bearer channel sending control messages at a second interval; and
monitor the second bearer channel at the second interval, wherein the first bearer channel and second bearer channel are evolved multimedia broadcast multicast services (eMBMS) bearer channels and the first interval is different than the second interval.

9. The device of claim 8 wherein the memory further comprises instructions to:
continue to monitor the first bearer channel while monitoring the second bearer channel.

10. The device of claim 8 wherein the instructions to receive the indication to monitor the second bearer channel further comprises instructions to:
receive the indication over the first bearer channel.

11. The device of claim 8 wherein the instructions to receive the indication to monitor the second bearer channel further comprises instructions to:
receive the indication as a unicast message directed to the device.

12. The device of claim 8 wherein messages sent over the second bearer channel have greater time sensitivity than messages sent over the first bearer channel.

13. A non-transitory processor readable medium containing a set of instructions thereon that when executed by a processor cause the processor to:
transmit messages over a first bearer channel, the first bearer channel sending control messages at a first interval;
transmit messages over a second bearer channel, the second bearer channel sending control messages at a second interval;
determine a wireless device monitoring the first bearer channel shall monitor the second bearer channel; and
send an indication to the wireless device to monitor the second bearer channel, wherein the first bearer channel and second bearer channels are evolved multimedia broadcast multicast services (eMBMS) bearer channels.

14. The medium of claim 13 further comprising instructions to:
send the indication to the wireless device to monitor the second bearer channel over the first bearer channel.

15. The medium of claim 13 wherein the first interval is different than the second interval.

16. The medium of claim 15 wherein the instructions to determine a wireless device monitoring the first bearer channel shall monitor the second bearer channel further comprise instructions to:
determine anticipated activity for the wireless device; and
determine that the anticipated activity for the wireless device includes time sensitive messages.

17. The medium of claim 16 further comprising instructions to:
determine there is no additional anticipated activity including time sensitive messages; and
send an indication to the wireless device to discontinue monitoring the second bearer channel.

* * * * *